(12) United States Patent
Yang et al.

(10) Patent No.: US 7,546,278 B2
(45) Date of Patent: Jun. 9, 2009

(54) CORRELATING CATEGORIES USING TAXONOMY DISTANCE AND TERM SPACE DISTANCE

(75) Inventors: Huai-Yuan Yang, Beijing (CN); Tie-Yan Liu, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 164 days.

(21) Appl. No.: 11/375,606

(22) Filed: Mar. 13, 2006

(65) Prior Publication Data

US 2007/0214186 A1 Sep. 13, 2007

(51) Int. Cl.
*G06F 17/00* (2006.01)

(52) U.S. Cl. .............................. 706/20; 706/14; 706/45; 707/6

(58) Field of Classification Search .................... 706/12, 706/14, 16–18, 20, 45, 55, 61; 707/1, 3, 707/6, 7

See application file for complete search history.

(56) References Cited

U.S. PATENT DOCUMENTS

| | | | | |
|---|---|---|---|---|
| 6,360,227 | B1 * | 3/2002 | Aggarwal et al. | 707/102 |
| 6,446,061 | B1 * | 9/2002 | Doerre et al. | 707/3 |
| 7,085,771 | B2 * | 8/2006 | Chung et al. | 707/102 |
| 2003/0030637 | A1 * | 2/2003 | Grinstein et al. | 345/420 |
| 2005/0080781 | A1 * | 4/2005 | Ryan et al. | 707/5 |
| 2006/0242147 | A1 * | 10/2006 | Gehrking et al. | 707/7 |

OTHER PUBLICATIONS

Li et al., "D2.5.2 Report: Quantitative Evaluation Tools and Corpora: version 2", Dec. 2005, pp. 1-25.*

Dekel, Ofer et al., "Large Margin Hierarchical Classification," Proceedings of the 21st International Conference on Machine Learning, Banff, Canada, 2004.

Fletcher, Roger, "On the Barzilai-Borwein Method," University of Dundee, Dundee, Scotland, Oct. 2001.

Baeza-Yates, Ricardo and Berthier Ribeiro-Neto, "Chapter 2 Modeling," Modern Information Retrieval, Pearson—Addison Wesley, © 1999 by the ACM Press, 63 pages.

Bi, Jinbo, "Multi-Objective Programming in SVMs," Proceedings of the Twentieth International Conference on Machine Learning (ICML-2003), Washington DC, 2003, 8 pages.

Fonseca, Carlos M. and Peter J. Fleming, "An Overview of Evolutionary Algorithms in Multiobjective Optimization," May 19, 1995, Appreance in Evolutionary Computation Spring 1995, pp. 1-25.

Hofmann, Thomas and Lijuan Cai, "Learning with Taxonomies: Classifying Documents and Words," In Conference on Neural Information Processing Systems, 2003, 8 pages.

Huang, Kaizhu et al., "Learning Large Margin Classifiers Locally and Globally," Proceedings of the 21st International Conference on Machine Learning, Banff, Canada, 2004, 8 pages.

Lewis, David D., "Naive (Bayes) at Forty: The Independence Assumption in Information Retrieval," In ECML, 1998, 12 pages.

Page, L., S. Brin, R. Motwani and T. Winograd, "The PageRank Citation Ranking: Bringing Order to the Web," Jan. 29, 1998, Stanford University Technical Report (17 pages).

(Continued)

*Primary Examiner*—David R Vincent
*Assistant Examiner*—Omar F Fernandez Rivas
(74) *Attorney, Agent, or Firm*—Perkins Coie LLP (57) ABSTRACT

A method and system for determining similarity or correlation between categories of a hierarchical taxonomy for documents by combining heterogeneous similarity metrics is provided. A correlation system uses both a taxonomy distance metric and a term space distance metric to represent the similarity between categories. The correlation system finds a new distance metric for categories that factors in both the taxonomy distance metric and the term space distance metric. The new distance metric can then be used by classifiers to more accurately represent the correlation between categories.

5 Claims, 6 Drawing Sheets

OTHER PUBLICATIONS

Raydan, Marcos, "The Barzilai and Borwein Gradient Method for the Large Scale Unconstrained Minimization Problem," May 16, 1995, SIAM J. Optim., vol. 7, No. 1, Feb. 1997, © Society for Industrial and Applied Mathematics, pp. 26-33.

Sun, Aixin and Ee-Peng Lim, "Hierarchical Text Classification and Evaluation," Proceedings of the 2001 IEEE International Conference on Data Mining (ICDM 2001), Nov. 2001, pp. 521-528.

Toutanova, Kristina, Francine Chen, Kris Popat and Thomas Hofmann, "Text Classification in a Hierarchical Mixture Model for Small Training Sets," Conference on Information and Knowledge Management (CIKM) 2001, 8 pages.

Vapnik, Vladimir N., "Chapters 9 Perceptrons and Their Generalizations, 10 The Support Vector Method for Estimating Indicator Functions, and 11 The Support Vector Method for Estimating Real-Valued Functions," Statistical Learning Theory, A Wiley-Interscience.

Yang, Yiming, "An Evaluation of Statistical Approaches to Text Categorization," Apr. 10. 1997, CMU-CS-97-127, 12 pages.

\* cited by examiner

CORRELATING CATEGORIES USING TAXONOMY DISTANCE AND TERM SPACE DISTANCE

BACKGROUND

Text classification is being increasingly used to facilitate browsing and maintaining of large collections of web-based documents. The classifications or categories are typically defined using a hierarchical taxonomy. A taxonomy is organized into a tree-like structure that defines sub-categories within categories. Because web-based documents cover virtually any topic, taxonomies may contain thousands and even hundreds of thousands of categories. For example, the Yahoo! Directory contains approximately 300,000 categories.

The classification of web-based documents into categories can facilitate browsing by allowing search results to be organized by category or by allowing a category to be specified as a search criterion. Because it would be impractical to manually categorize millions of web-based documents, automatic document classifiers have been developed. For example, a document classifier may have a support vector machine classifier for each category. A support vector machine classifier for a category can be trained using the documents that are labeled as being within the category or not within the category. To classify a document, each support vector machine classifier classifies the document. The document is then considered to be in the categories of those support vector machine classifiers that indicated a positive result. An example document classifier implements the "Hieron" classification technique as described in Dekel, O., Keshet, J., and Singer, Y., "Large Margin Hierarchical Classification," Proc. of $21^{st}$ Int'l Conf. on Machine Learning, Banff, Canada, 2004, which is hereby incorporated by reference. The Hieron classification technique defines a classifier for each category in terms of the classifiers of ancestor categories. Ancestor categories are the categories in the path to the root category. The Hieron classification technique attempts to ensure that the margin between each correct category and incorrect category is at least the square root of the path length between the categories. If the categories are represented as nodes of a taxonomy tree and parent-child relationships are represented by edges, then the path length is the number of edges in the shortest path between the categories. The path length serves as an indication of the correlation between two categories. Other classification techniques also use a path length based distance when training classifiers.

The accuracy of classifiers that use a path length based distance depends in part on how well path length represents the correlation between categories. Although path length is easy to calculate, it fails to adequately correlate categories in many instances. For example, a "sport" category may have child categories of "water ballet" and "wrestling" separated by a path length of 2. The "wrestling" category may have a grandchild category of "Sumo wrestling" that is also separated by a path length of 2. Intuitively, the "wrestling" category is more similar to or is more highly correlated to the "Sumo wrestling" category than to the "water ballet" category, but the path length suggests similar correlations.

SUMMARY

A method and system for determining similarity or correlation between categories of a hierarchical taxonomy for documents by combining heterogeneous correlation metrics is provided. A correlation system uses both a taxonomy distance metric and a term space distance metric to represent the correlation between categories. The term space distance metric may be derived from a term feature vector representing the documents within each category. The correlation system finds a new distance metric for categories that factors in both the taxonomy distance metric and the term space distance metric. The new distance metric can then be used by classifiers to more accurately represent the correlation between categories.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for determining similarity or correlation between categories of a hierarchical taxonomy for documents by combining heterogeneous similarity metrics is provided. In one embodiment, a correlation system uses both a taxonomy distance metric and a term space distance metric to represent the similarity between categories. The taxonomy distance metric may be the path length between categories within the taxonomy. The term space distance metric may be derived from a term feature vector representing the documents within each category. The correlation system represents each document with a term feature vector. For example, the term feature vector may be based on keywords within a document, a term frequency by inverse document frequency metric, and so on. The correlation system may generate a term feature vector for a category using various techniques. For example, the correlation system may use a mean of the term feature vectors of the documents within a category as the term feature vector for the category. The correlation system attempts to find a new distance metric for categories that factors in both the taxonomy distance metric and the term space distance metric. The new distance metric can then be used by classifiers, such as a Hieron classifier, to more accurately represent the correlation between categories.

Figure 1:
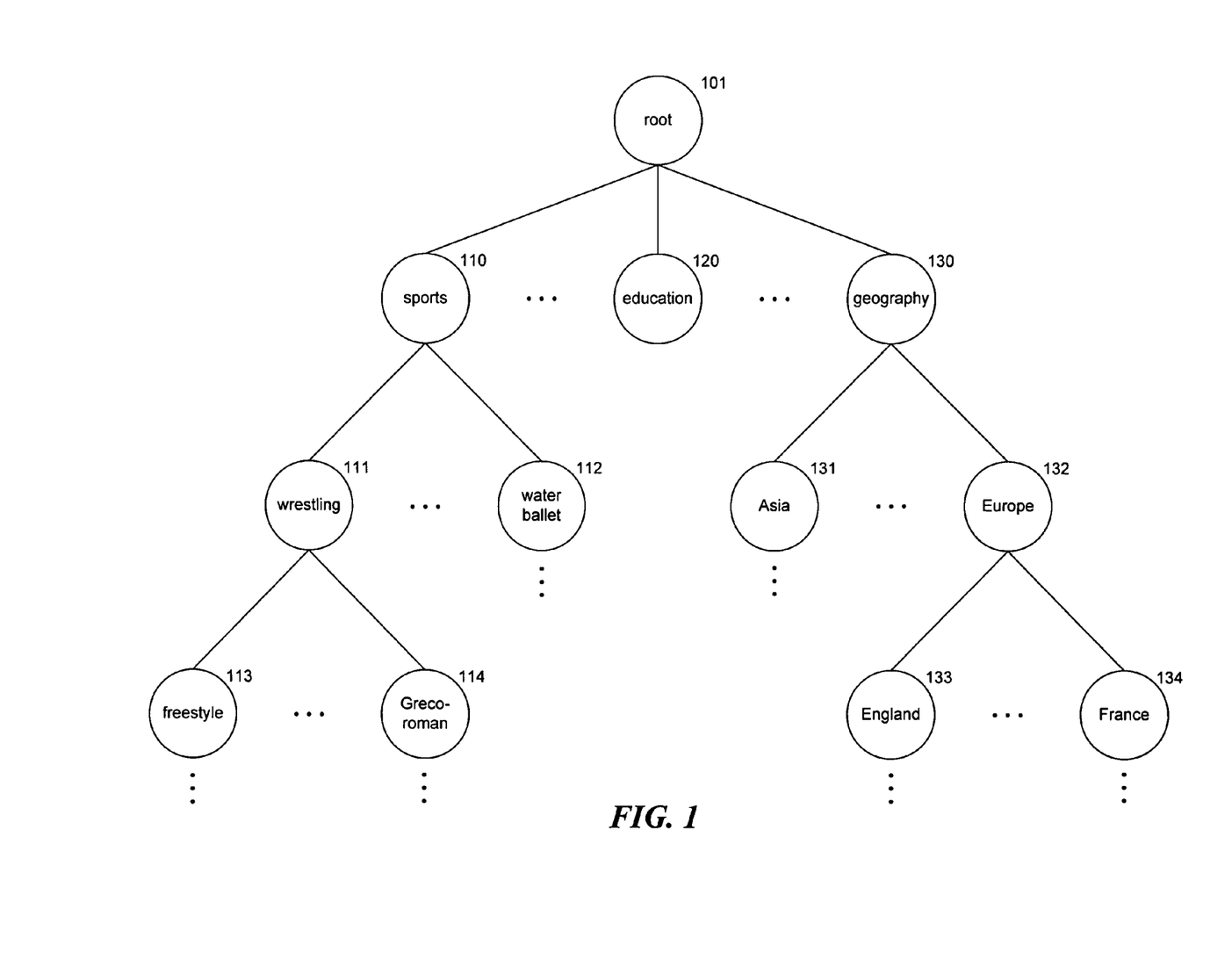
FIG. 1 is a diagram that illustrates a portion of an example hierarchical taxonomy.

FIG. 1 is a diagram that illustrates a portion of an example hierarchical taxonomy. In this example, the root 101 of the taxonomy has child categories of sports 110, education 120, and geography 130. The sports category includes descendent categories of wrestling 111, water ballet 112, freestyle wrestling 113, and Greco-Roman wrestling 114. The geography category includes descendent categories of Asia 131, Europe 132, England 133, and France 134. The path length between the wrestling category and the water ballet category is 2 based on the path that includes the wrestling category, the sports category, and the water ballet category. The path length between the wrestling category and the Asia category is 4 based on the path that includes the wrestling category, the sports category, the root category, the geography category, and the Asia category.

Figure 2:
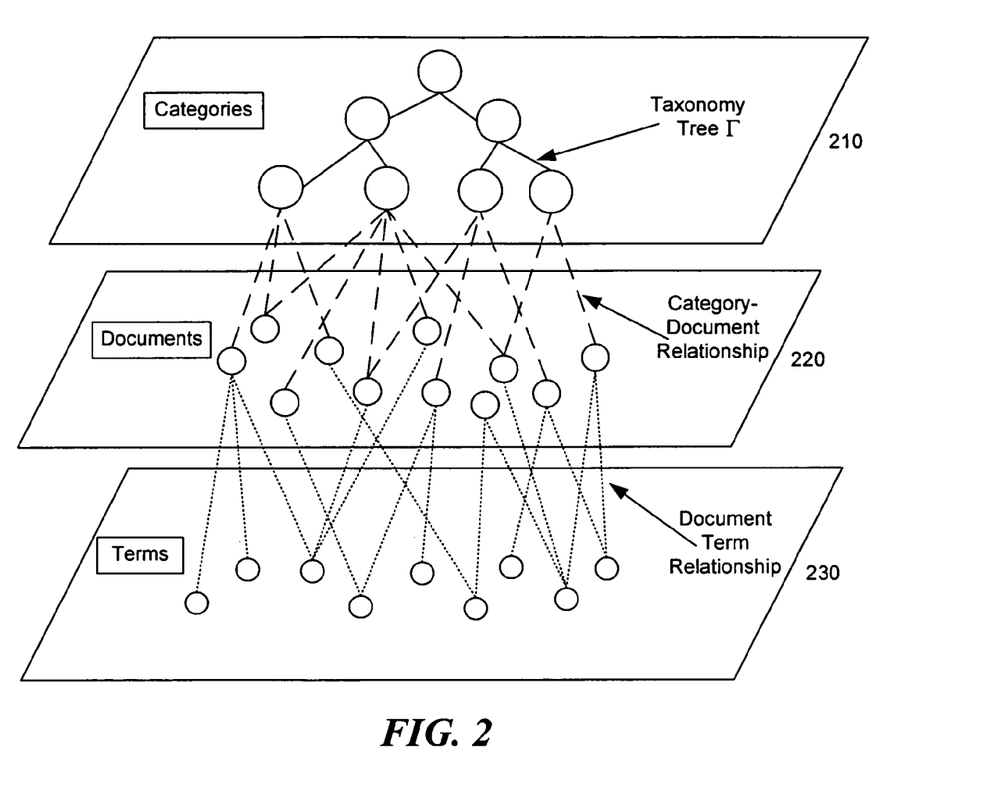
FIG. 2 is a diagram that illustrates the relationship between categories of a hierarchical taxonomy and terms within documents.

FIG. 2 is a diagram that illustrates the relationship between categories of a hierarchical taxonomy and terms within documents. In this example, a document may be classified into multiple categories. The hierarchical taxonomy 210 includes a node, represented by a large circle, for each category along with edges indicating the parent-child relationships between the categories. The documents of a collection 220 are represented by medium circles. The relationship between a category and a document is represented by a dashed line between the medium circle representing the document and the large circle representing the category. The terms 230 of the documents are represented by small circles. The relationship between a document and a term is represented by a line between the medium circle representing the document and the small circle representing the term. In one embodiment, the correlation system represents categories based on the relationship between the categories and the documents and relationship between the documents and the terms.

The correlation system may represent the taxonomy distance between category i and category j as $d(i,j)$ where $d(i,j)$ is the number of edges (i.e., path length) in the taxonomy from category i to category j. The correlation system represents the taxonomy distance between all pairs of categories by an n-by-n matrix A, where n represents the number of categories in the taxonomy and where $A_{ij}=d(i,j)$. The correlation system represents the relationship between categories and terms by an n-by-m matrix B, where n represents the number of categories in the taxonomy and m represents the number of terms or dimensionality of term space. Thus, the $i^{th}$ row, $b_i$, of B represents a term feature vector for the $i^{th}$ category. In one embodiment, the correlation system sets the term feature vector for a category to a mean of the term feature vectors of all the documents within the category. Alternatively, the correlation system could derive the term feature vector for a category from less than all the documents within the category or based on a metric other than the mean, such as the median.

The correlation system represents a category using a new feature vector that is a combination of the taxonomy distance metric and the term distance metric. The correlation system represents the new feature vector in a Euclidian space of k dimensions. The correlation system represents the new feature vector for category i as $x_i$. The collection of the new feature vectors for all categories is represented as $X=[x_1, x_2 \ldots x_n]^T$, where n is the number of categories and each $x_i$ is a k-dimension vector. The correlation system generates a combined distance metric with a first objective of minimizing the difference between the distance of categories calculated in the new Euclidean space and the path length in the taxonomy and a second objective of minimizing the difference between the distance of categories calculated in the term feature space and the new Euclidean space. The two objective functions are represented by the following equations:

$$\min_x \|A-D_x\|_F^2$$

$$\min_x \|BB^T-XX^T\|_F^2 \qquad (1)$$

where $D_x=[\|x_i-x_j\|_F]_{n \times n}$, and $\|\cdot\|_F^2$ is the F-norm. Equation 1 represents a multi-objective programming (MOP) problem.

The correlation system in one embodiment converts the MOP to a single-objective programming problem by linearly combining the objective functions as represented by the following equation:

$$\min_x \alpha \|A-D_x\|_F^2 + (1-\alpha)\|BB^T-XX^T\|_F^2 \qquad (2)$$

where $\alpha$ represents the weight distribution between the taxonomy distance metric and the term space distance metric. Equation 2 represents a very large-scale optimization problem. In particular, there are nk unknowns that need to be solved, and as described above n, which is the number of categories, can be 300,000 or more. Many existing optimization algorithms are not effective at handling large-scale optimization problems because they need second-order information, which corresponds to space complexity of $O(n^2k^2)$. In one embodiment, the correlation system employs a Global Barzilai and Borwein ("GBB")-based algorithm, which requires a space complexity of only O(nk). A GBB-based algorithm is described in Raydan, M., "The Barzilai and Borwein Gradient Method for the Large Scale Unconstrained Minimization Problem," SIAM Journal on Optimization, vol. 7, issue 1, pp. 26-33, 1997, which is hereby incorporated by reference. The solution to Equation 2 provides a new distance matrix $D_x$, which is referred to as the refined category distance ("RCD") matrix, that contains a new distance for each pair of categories.

Since many document taxonomies have tens of thousands of categories, the complexity can still be high even with a GBB-based algorithm. To further reduce the complexity, the correlation system applies some techniques based on matrix decomposition. These techniques are particularly useful when $k \leq n$.

In one embodiment, the correlation system uses eigenvalue decomposition to represent $BB^T$. The correlation system may use k eigenvalues and their associated eigenvectors of $BB^T$. The correlation system thus approximates $BB^T$ by the following equation:

$$BB^T \approx U_k \Sigma_k^2 U_k^T \qquad (3)$$

where $U_k$ is an n×k matrix, $\Sigma_k$ is a k×k square matrix, and $U_k \Sigma_k$ is also an n×k matrix that has the same dimension as X. If $\|U_k \Sigma_k - X\|_F^2$ is sufficiently small, then $\|BB^T-XX^T\|_F^2$ will also be very small due to the characteristics of eigenvalue decomposition. The correlation system thus represents the combined objective function by the following equation:

$$\min_x \alpha \|A-D_x\|_F^2 + (1-\alpha)\|U_k \Sigma_k - X\|_F^2 \qquad (4)$$

In practice, the correlation system can calculate $U_k$ and $\Sigma_k$ using the singular value decomposition of B, which can be computed more efficiently than the eigenvalue decomposition of $BB^T$. The singular value decomposition can be represented by the following equation:

$$B \approx U_k \Sigma_k V_k^T \qquad (5)$$

The above singular value decomposition can actually be regarded as the spectral embedding of the category-term bipartite graph. In some cases, the graph may be too sparse and even unconnected resulting in a singular value decomposition that may not be effective. To improve the effectiveness, the correlation system adds a smoothing item to matrix B before conducting singular value decomposition to improve the connectivity of its corresponding bipartite graph. The smoothing item can be represented by the following equation:

$$B^{new} = \beta B + (1-\beta)\frac{1}{n}ee^T \quad (6)$$

where $e = [1, 1, \ldots, 1]^T$.

Figure 3:
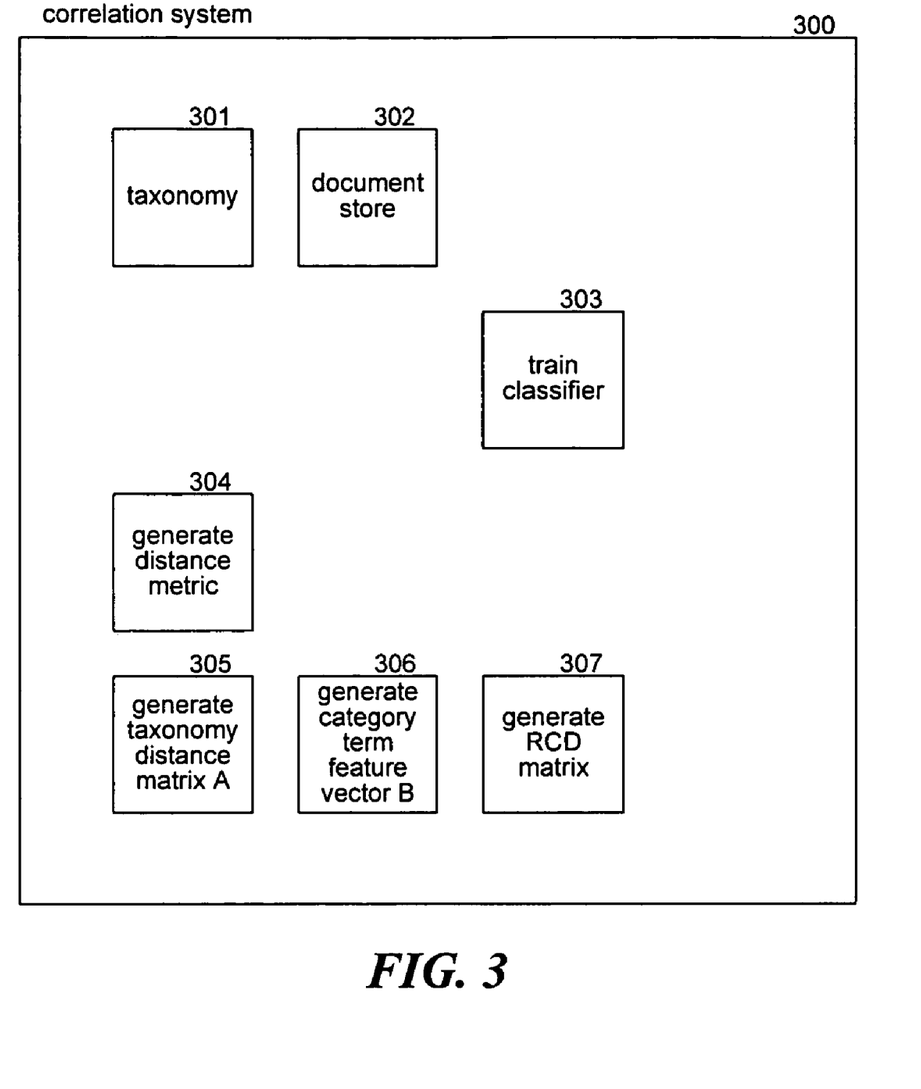
FIG. 3 is a block diagram that illustrates components of the correlation system in one embodiment.

FIG. 3 is a block diagram that illustrates components of the correlation system in one embodiment. The correlation system 300 includes a taxonomy store 301, a document store 302, and a train classifier component 303. The taxonomy store contains the taxonomy and, for each category of the taxonomy, an indication of the documents within that category and a term feature vector for that category. The document store contains a term feature vector for each document. The term feature vector for a category may be derived from the term feature vectors of the documents within that category. The train classifier component trains a classifier, such as a Hieron classifier, based on a combined distance metric. The correlation system also includes a generate distance metric component 304, a generate taxonomy distance matrix component 305, a generate category term feature vector matrix component 306, and a generate RCD matrix component 307. The generate distance metric component generates an RCD matrix indicating the combined distances based on the information of the taxonomy store. The generate distance metric component invokes the generate taxonomy distance matrix component, the generate category term feature vector matrix component, and the generate RCD matrix component.

The computing devices on which the correlation system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the correlation system. In addition, the data structures and message structures may be stored or transmitted via a data transmission medium, such as a signal on a communications link. Various communications links may be used, such as the Internet, a local area network, a wide area network, or a point-to-point dial-up connection.

The correlation system may provide distance information for use by classifiers whose results are accessed by various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The correlation system may also provide its distance information to any type of application that uses category correlation information.

The correlation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
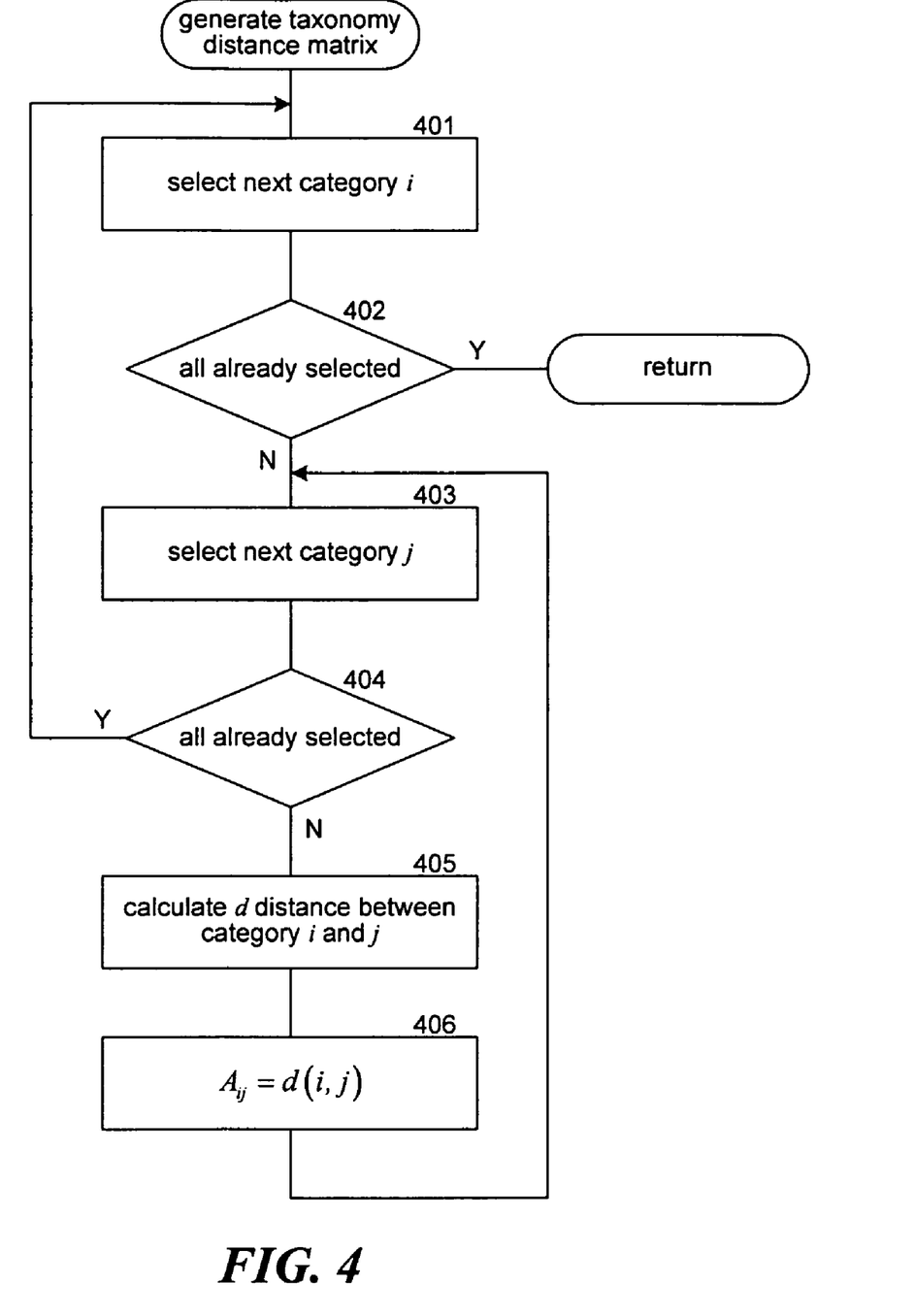
FIG. 4 is a flow diagram that illustrates the processing of the generate taxonomy distance matrix component of the correlation system in one embodiment.

FIG. 4 is a flow diagram that illustrates the processing of the generate taxonomy distance matrix component of the correlation system in one embodiment. The component generates a matrix A that contains the taxonomy distances between pairs of categories. The component loops selecting each pair of categories and calculating its path length. In block 401, the component selects the next category i. In decision block 402, if all the categories i have already been selected, then the component returns, else the component continues at block 403. In block 403, the component selects the next category j for the selected category i. In decision block 404, if all the categories j have already been selected for the selected category i, then the component loops to block 401 to select the next category i, else the component continues at block 405. In block 405, the component calculates the taxonomy distance between the selected category i and the selected category j. The taxonomy distance may be the path length between the selected categories or some other metric such as one that gives greater weight to direct ancestors than to other "relatives" with the same path length. In block 406, the component sets the element of matrix A corresponding to the selected category i and the selected category j to the calculated distance. The component then loops to block 403 to select the next category j.

Figure 5:
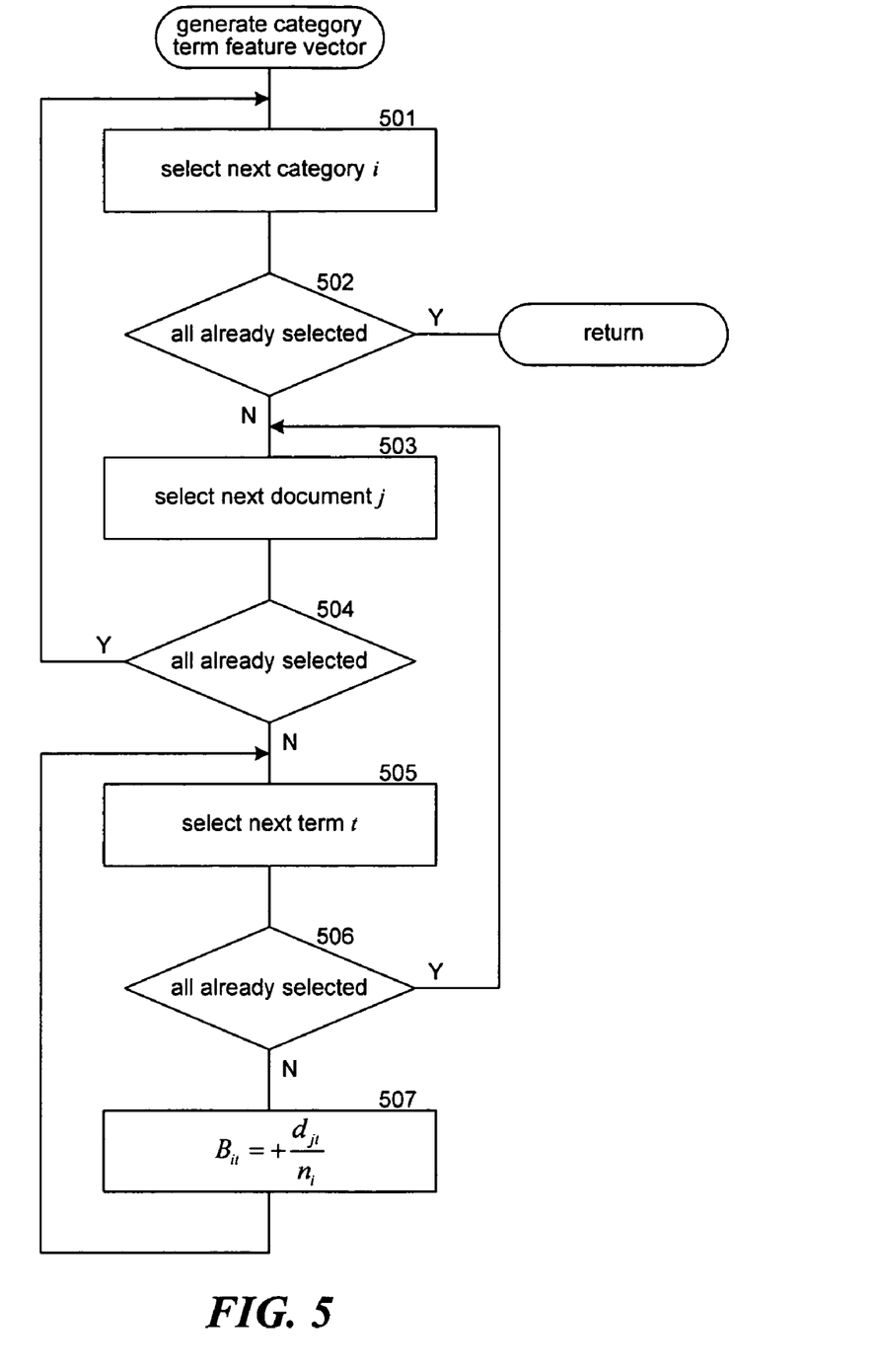
FIG. 5 is a flow diagram that illustrates the processing of the generate category term feature vector component of the correlation system in one embodiment.

FIG. 5 is a flow diagram that illustrates the processing of the generate category term feature vector component of the correlation system in one embodiment. The component generates a matrix B that contains the term feature vector for each category. The component loops selecting each category, each document within a category, and each term within a document. In block 501, the component selects the next category i. In decision block 502, if all the categories i have already been selected, then the component returns, else the component continues at block 503. In block 503, the component selects the next documented within the selected category i. In decision block 504, if all such documents j have already been selected, then the component loops to block 501 to select the next category i, else the component continues at block 505. In block 505, the component selects the next term t. In decision block 506, if all the terms t for the selected document j have already been selected, then the component loops to block 503 to select the next document j, else the component continues at block 507. In block 507, the component adds the contribution of the selected term t of the selected document j to the term feature vector for the selected category i, where $n_i$ represents the number of documents within the selected category i and $d_{ij}$ represents the term feature vector element for the selected term t for the selected document j. The component then loops to block 505 to select the next term t for the selected document j.

Figure 6:
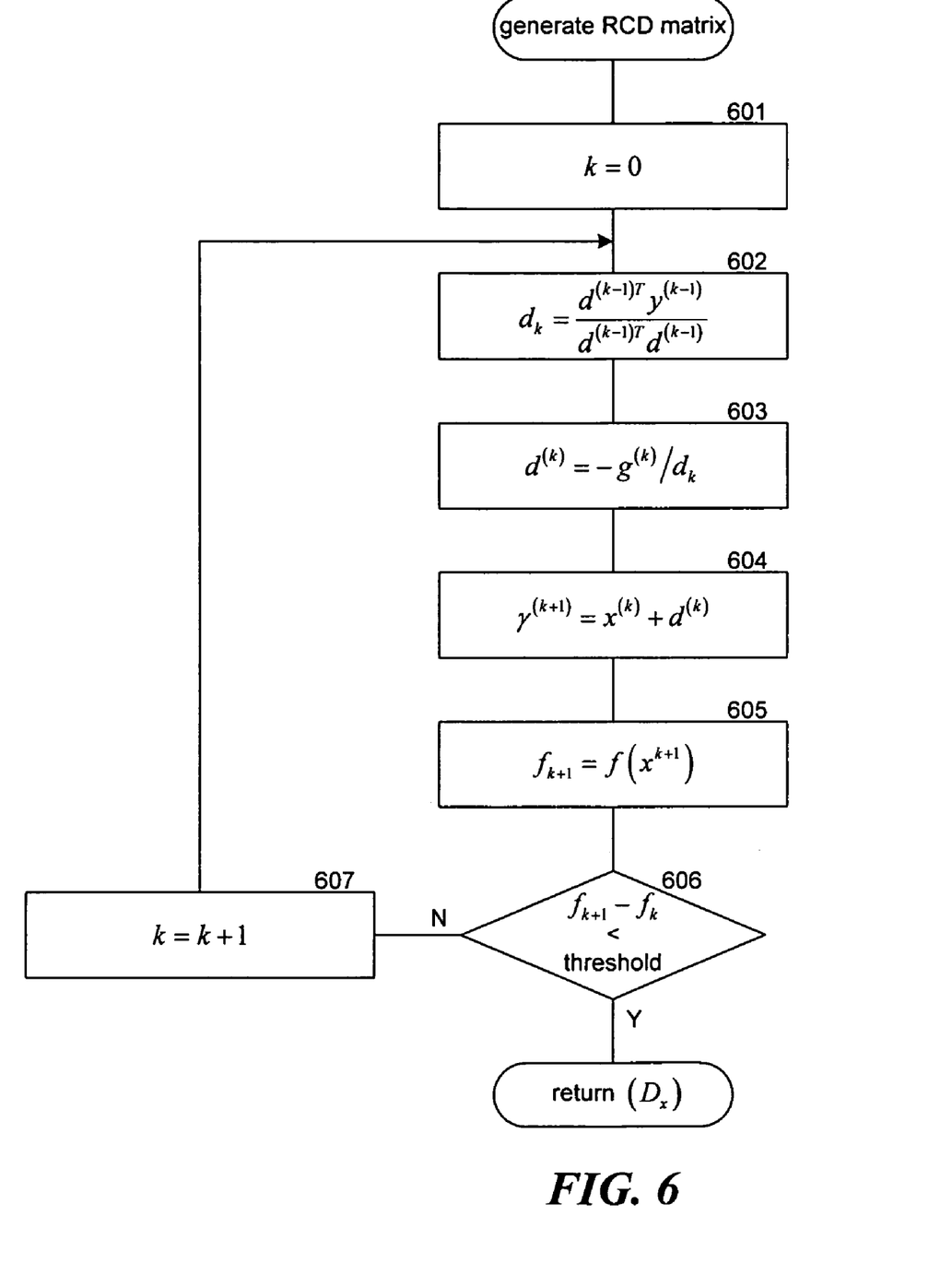
FIG. 6 is a flow diagram that illustrates the processing of the generate RCD matrix component of the correlation system in one embodiment.

FIG. 6 is a flow diagram that illustrates the processing of the generate RCD matrix component of the correlation system in one embodiment. The component implements a GBB-based algorithm as described above to solve for the objective function of Equation 2 to generate the RCD matrix. The component iteratively calculates the objective function until the calculation converges on a solution. In block 601, the component initializes the iteration count. In block 602, the component calculates $\alpha_k$ based on the step $d^{(k-1)}$ used in the previous iteration. In block 603, the component calculates the step $d^{(k)}$ for this iteration as the negative of the gradient of the objective function divided by $\alpha_k$. In block 604, the component calculates the new value for $x^{(k+1)}$. In block 605, the component calculates the new value for the objective function. In decision block 606, if the new value for the objective function is within a threshold amount of the previous value for the objective function, then the component has converged on a solution and the component returns the RCD matrix, else the component continues at block 607. In block 607, the component increments to the next iteration and loops to block 602 to perform the next iteration.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. "Document" refers to any collection of terms or words, such as articles, news stories, web page content, email content, and so on. Accordingly, the invention is not limited except as by the appended claims.

We claim:

1. A computer-readable storage device containing instructions for controlling a computer system to generate a distance metric for pairs of categories of a hierarchical taxonomy for documents, by a method comprising:

providing for each pair of categories in the taxonomy a path length between the categories, the taxonomy being represented by nodes and edges between nodes, each node representing a category, the edges representing a hierarchy of the categories, wherein a path length for a pair of categories is the number of edges in the shortest path between nodes representing the categories, each pair of categories referring to each possible combination of two different categories;

providing for each pair of categories in the taxonomy a term space distance indicating distance between term feature vectors representing terms of documents within the categories, each term feature vector for a document including frequencies for keywords in the document;

generating a distance metric between pairs of categories based on minimization of the differences between path lengths and distances derived from new feature vector representations of the categories and minimization of the differences between term space distances between term feature vectors and distances derived from the new feature vector representations;

classifying documents into categories of the hierarchical taxonomy using the generated distance metric;

organizing search results of documents into categories based on the classification of the documents into categories; and presenting to a user the search results as organized into the categories wherein the term space distances are F-norm distances.

2. The computer-readable storage device of claim 1 including training a document classifier using the distance metric.

3. The computer-readable storage device of claim 1 wherein the document classifier is a Hieron-based classifier.

4. The computer-readable storage device of claim 3 including classifying documents using the trained document classifier.

5. A computer-readable device containing instructions for controlling a computer system to generate a distance metric for pairs of categories of a hierarchical taxonomy for documents, by a method comprising:

providing for each pair of categories in the taxonomy a path length between the categories, each pair of categories referring to each possible combination of two different categories;

providing for each pair of categories in the taxonomy a term space distance indicating distance between term feature vectors representing terms of documents within the categories;

generating a distance metric between pairs of categories based on minimization of the differences between path lengths and distances in new feature vector representations of the categories and minimization of the differences between distances in term feature vectors and the new feature vector representations;

classifying documents into categories of the hierarchical taxonomy using the generated distance metric;

organizing search results of documents into categories based on the classification of the documents into categories; and presenting to a user the search results as organized into the categories wherein the generating of a distance metric minimizes the following equations:

$$\min_x \|A - D_x\|_F^2$$

$$\min_x \|BB^T - XX^T\|_F^2$$

where $D_x = [\|x_i - x_j\|_F]_{n \times n}$, $\|\cdot\|_F^2$ is the F-norm, A represents a path length matrix, B represents a matrix containing the term feature vector for each category, X represents a new feature vector for each category, and n represents the number of categories.

* * * * *